Feb. 13, 1968  P. N. F. LANGMEAD  3,368,847

ADJUSTABLE SELF-LOCKING JOINTS

Filed Aug. 29, 1966

3,368,847
ADJUSTABLE SELF-LOCKING JOINTS
Peter Norman Frederick Langmead, Ashford, Common, Middlesex, England, assignor to Zealand Engineering Company Limited, Ashford Common, Middlesex, England, a British company
Filed Aug. 29, 1966, Ser. No. 575,786
6 Claims. (Cl. 297—366)

ABSTRACT OF THE DISCLOSURE

An adjustable self-locking joint comprises two parts pivoted together one part being formed with teeth circumferentially spaced apart around the axis of pivoting and the other part carrying a pawl which is urged into engagement with the teeth by a spring. A cam edge on the first part of the joint engages the pawl and moves it out of engagement with the teeth at one limit of the movement of one part of the joint relatively to the other. A pawl controlling plate is rotatable about the axis of pivoting and is in frictional engagement with the first part of the joint and is arranged to engage the pawl and hold it out of engagement with the teeth as the first part is swung relatively to the second part to a required position. When the first part reaches the required position it is swung to a limited extent in the reverse direction and its frictional engagement with the pawl controlling plate moves the plate away from the pawl so that the pawl is automatically snapped by the spring into engagement with the teeth to lock the joint in the required position.

---

This invention relates to an adjustable self-locking joint particularly for use between a back rest and body supporting part of a piece of furniture. The self-locking joint is of the kind comprising two parts pivoted together, one of which parts is provided with teeth circumferentially spaced apart around the axis of pivoting and the other of which parts carries a pawl engageable with said teeth and pivoted to swing about an axis parallel to and spaced from the first said axis, a pawl controlling device rotatable about the first said axis and in frictional engagement with said one part of the joint, means for moving the pawl to an inoperative position consequent upon the movement of said one part to one limit of its movement relatively to the other part of the joint and other means for moving the pawl into engagement with the teeth the arrangement being such that the first said means are arranged to free the pawl when said one part is moved towards its other limit of movement although the pawl is still held in its inoperative position by said control device, and when said one part reaches a selected position, movement of that one part in the opposite direction to a limited extent frees the control device from the pawl and said other means move the pawl into engagement with a tooth on said one member. In certain previous known arrangements of the kind referred to the means for moving the pawl into engagement with a tooth after the pawl has been released by the pawl control device has been effected by said limited movement of said one part of the joint which carries with it the said control device and a part of that device is arranged to urge the pawl into engagement with the tooth.

According to this invention an adjustable self-locking joint of the kind first referred to above is characterised in that the means for moving the pawl to an operative position after it has been released by the frictionally actuated pawl control device comprises a spring and/or gravitational loading means. Such an arrangement has the advantage over the previous arrangements in that a snap action of the pawl is effected rendering it more certain to engage a required tooth.

The aforesaid spring may be arranged between the pawl and either a fixed abutment or an abutment face on said pawl control device.

In one arrangement one end of a helical compression spring abuts a face on the pawl and the other end may encircle a locating projection on the pawl control device.

In yet another arrangement one end of a leaf spring may be secured to said other part of the joint, the other end of which spring abuts a face on the pawl.

Figure 1:
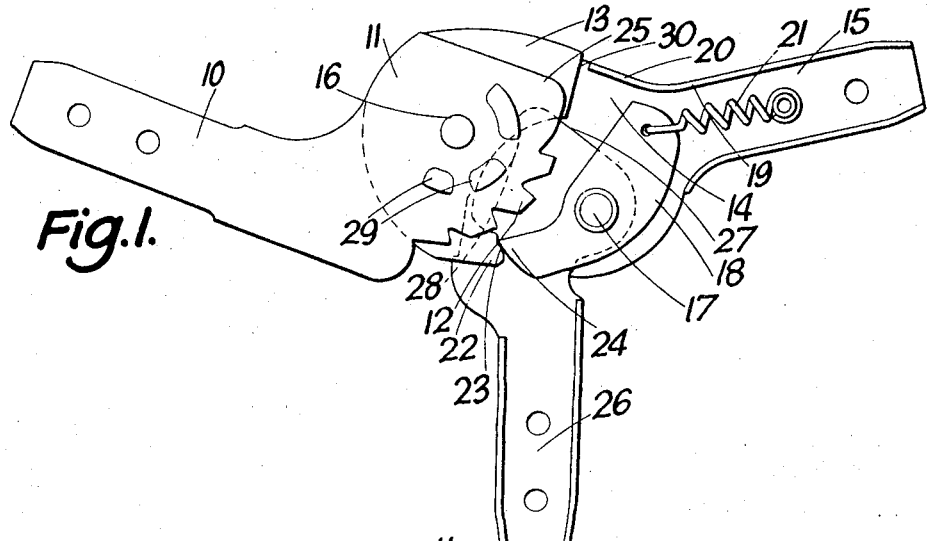
Figure 2:
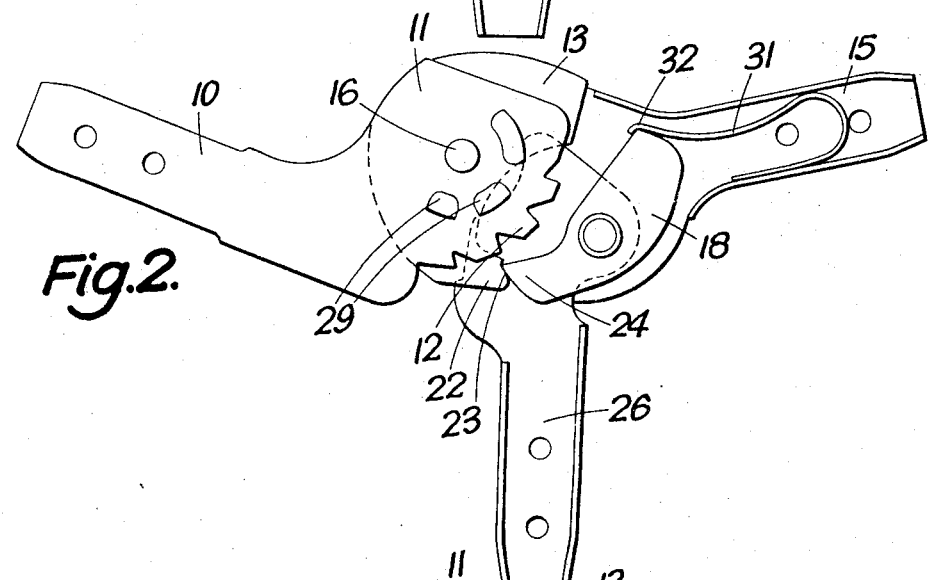
Figure 3:
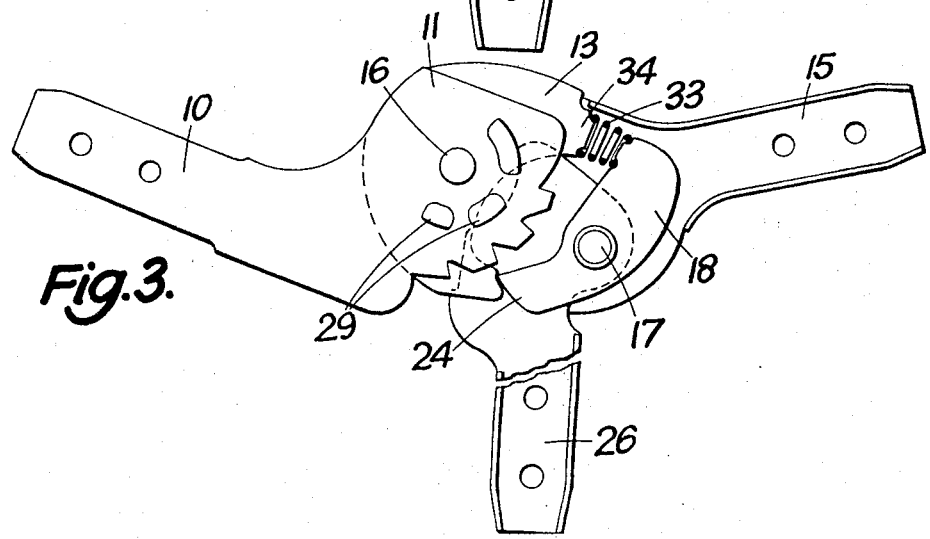

The following is a more detailed description of various embodiments of the invention reference being made to the accompanying drawings in which:

FIGURES 1, 2 and 3 are similar views of three alternative forms of adjustable self-locking joint, suitable for use at the junction between the seat, back and leg parts of a foldable chair or bed. In each case a side plate of the joint is removed for clarity.

Said one part of the joint comprises a tubular arm 10 which is for connection to the back rest part of the chair. The arm 10 is provided at its end with two spaced friction plates one of which is indicated at 11, each of the plates being provided with a circumferential row of teeth 12. Disposed between the two plates is a pawl control member 13. The two plates 11 on said one part, between which the pawl control member is arranged, are disposed between two plates 14 (only one of which is shown) formed on a tubular arm 15 constituting the other part of the joint. A pivot pin 16 extends through the two plates 14, the two plates 11, and the pawl control member 13. The pivot pin 16 comprises a rivet or bolt by means of which the plates 11 are clamped into frictional engagement with the pawl control member 13.

Pivotally mounted by means of a pin 17 (which may also be a rivet or bolt) between the two plates 14 is a pawl 18. The plates 14 are provided with rim portions 19 which are cut away so as to permit pivotal movement of the arm 10 on the arm 15 and also so as to provide a shoulder 20 hereinafter referred to.

The arms 10 and 15, as well as the arm 26 referred to below, are formed from two metal pressings connected together face to face, each pressing comprising a semi-circular cross-section portion, providing half of the tubular arm, and a flat portion providing one of the spaced plates at the end of the arm.

A helical tension spring 21 is connected between the pawl 18 and a part of the arm 15 so as to urge the pawl 18 in a clockwise direction. The pawl control member 13 is shaped to provide a projection 22 having a V-shaped recess 23 in the extremity thereof which may engage the nose 24 of the pawl to hold it out of engagement with the teeth 12 on the plates 11.

A portion of each plate 11 beyond the teeth 12 is shaped to provide a cam lobe 25 which is engageable with the nose of the pawl when the arm 10 is folded close to the arm 15, and which lobes 25 swing the pawl 18 anti-clockwise against the action of the spring 21 so that the nose of the pawl is brought opposite the recess 23.

An arm 26, for attachment to a leg or a leg frame of the chair, is pivotally mounted on the pivot pin 17 between the plates 14 and is formed adjacent the pivot with two plates, only one of which is shown at 27, which plates are disposed on opposite sides of the plates 11 and the pawl 18 and are formed with concavely curved edge surfaces 28 which engage with spaced arcuate projections 29 on the plates 11. The arrangement of the curved edges 28 and the projections 29 is such that when the back rest of the chair is in an extended position, so that the arm 10 is in the position shown, the arm 26 is prevented from pivoting about the pin 17, but when the back rest is folded flat against the seat portion of the chair, i.e. the arm 10 is folded close to the arm 15, the projections 29 come out of engagement with the curved surface 28 so that the arm 26 is free to pivot about the pin 17 so that the leg portion of the chair may be folded flat against the back rest and seat parts. As the arm 10 is swung anti-clockwise from the folded position to erect the chair, the lobes 25 of the plates 11 engage the nose 24 of the pawl 18 and urge the pawl 18 anti-clockwise against the action of the spring 21 so as to bring the nose of the pawl into line with the recess 23 in the pawl control member. Thus with further anti-clockwise rotation of the arm 10, although the lobes 25 come away from the nose 24 of the pawl, the pawl control member 13 is swung slightly anti-clockwise (due to the friction between it and the plates 11) so that the recess 23 on the control member engages the point of the nose of the pawl and holds it out of engagement with the teeth 12. The plates 11 slide in relation to the pawl control member 13 until the arm 10 has been brought to the required angular position. When the arm 10 is in the required angular position the arm is moved very slightly clockwise again and due to the friction between the plates 11 and the pawl control member 13, the pawl control member 13 will be also moved slightly clockwise until the shoulder 30 abuts the shoulder 20. This clockwise movement of the pawl control member brings the recess 23 away from the nose of the pawl so that the pawl is snapped by the spring 21 into engagement with a tooth 12. Thus the arm 10 will be restrained against any further movement anti-clockwise although it will be possible to move it clockwise since the pawl will ratchet over the teeth 12. If it is required subsequently to move the arm 10 still further anti-clockwise, the arms 10 and 15 must first be brought together again so that the lobes 25 bring the nose 24 of the pawl clear of the teeth 12 and into engagement with the recess 23, as described above, whereupon the arm 10 may be swung anti-clockwise to the required new position and then moved very slightly clockwise, as described above, to locate the joint in that position.

In the alternative arrangement shown in FIGURE 2 the helical tension spring 21 is replaced by a leaf spring 31 which has one portion wedged in the tubular arm 15 and an end portion 32 engaging the end of the pawl 18 remote from the nose 24.

In the further arrangement shown in FIGURE 3 the helical tension spring is replaced by a helical compression spring 33 disposed between the end of the pawl 18 remote from the nose 24 and an abutment 34 on the pawl control member 13. For convenience, one end of the spring 33 is arranged to abut against a part of the control member 13 but it will be appreciated that alternatively the spring 33 may be disposed between the pawl 18 and any part of the joint to which the pawl 18 is relatively movable. For example, the spring 33 may be disposed between the pawl 18 and a tang bent out of the plate 14 at the location where the abutment 34 is shown in FIGURE 3. In this latter case the pawl control member 13 would be shaped so that it did not engage the tang or the tang may be used, instead of the aforementioned shoulder 20, to limit the rocking movement of the control member 13.

It will be appreciated that all the joints described above operate in the same general manner and in each case the spring alone urges the pawl, when it has been released by the pawl control member, into engagement with the teeth 12. This results in the joint having a positive "snap action" when it is adjusted and secured in one position.

In the arrangements shown above, the end of the pawl 18 remote from the nose 24 is larger and heavier than the other end of the pawl and thus the clockwise pivoting of the pawl into engagement with the teeth 12, under the action of the spring 21, 31 or 33, is assisted by gravity. In the alternative arrangement, not shown, the mass of the pawl at the end remote from the nose 24 is increased so that the spring may be dispensed with and gravity alone relied upon to urge the nose of the pawl into engagement with the teeth. It will be appreciated that such an arrangement depends, for its effective working, on the joint being the right way up so that the effect of gravity on the pawl urges it in a direction to engage the teeth 12.

I claim:
1. An adjustable self-locking joint comprising:
   (a) two parts pivoted together;
   (b) teeth formed on one part and circumferentially spaced around the axis of pivoting of the two parts;
   (c) a pawl carried by the other part and engageable with said teeth;
   (d) which pawl is pivoted on said other part to swing about an axis parallel to and spaced from the first said axis;
   (e) a pawl controlling device rotatable about the first said axis and in frictional engagement with said one part of the joint;
   (f) a cam edge provided on said one part of the joint and adapted to move the pawl to an inoperative position consequent upon the movement of said one part of the joint to one limit of its movement relatively to the other part of the joint;
   (g) the pawl controlling device maintaining the pawl in said inoperative position when said one part of the joint is moved away from said one limit;
   (h) movement of said one part, to a limited extent, back towards said one limit, when a selected position has been reached, moving the pawl controlling device by virtue of said frictional engagement to free the pawl from the restraint of the pawl controlling device; and
   (i) spring means which move the pawl into engagement with said teeth, thereby locking the joint, when the pawl is freed from the restraint of the pawl controlling device.

2. An adjustable self-locking joint according to claim 1 wherein the centre of gravity of the pawl is spaced away from the axis of pivoting thereof, and is so disposed that the effect of gravity on the pawl is to tend to urge it into engagement with said teeth.

3. An adjustable self-locking joint according to claim 1 wherein said spring means comprise a spring arranged between the pawl and a fixed abutment.

4. An adjustable self-locking joint according to claim 3 wherein the spring is arranged between the pawl and an abutment face on said pawl controlling device.

5. An adjustable self-locking joint according to claim 4 wherein the spring is a helical compression spring one end of which abuts a part of the pawl and the other end of which encircles a locating projection on the pawl controlling device.

6. An adjustable self-locking joint according to claim 3 wherein the spring is a leaf spring one end of which engages said other part of the joint, and the other end of which engages a part of the pawl.

References Cited

UNITED STATES PATENTS

| | | | |
|---|---|---|---|
| 773,720 | 11/1904 | Drury | 297—356 X |
| 2,911,245 | 11/1959 | Kurz | 287—99 |
| 2,959,206 | 11/1960 | Tedesco | 297—367 |
| 2,989,311 | 6/1961 | Bahmoller | 287—99 |
| 3,232,136 | 2/1966 | Bahmoller | 297—366 X |
| 3,299,466 | 1/1967 | Werner | 297—366 |
| 3,304,107 | 2/1967 | Bahmoller | 287—99 |

FOREIGN PATENTS

| | | |
|---|---|---|
| 1,148,050 | 5/1963 | Germany. |
| 1,216,130 | 5/1966 | Germany. |
| 364,596 | 11/1962 | Switzerland. |

BOBBY R. GAY, *Primary Examiner.*

DAVID J. WILLIAMOWSKY, *Examiner.*

G. O. FINCH, *Assistant Examiner.*